F. B. WHITAKER, DEC'D.
F. P. WHITAKER, EXECUTOR, AND E. G. GRIFFITHS, (FORMERLY WHITAKER,) EXECUTRIX.
SYSTEM FOR PROTECTING ELECTRIC CABLES.
APPLICATION FILED SEPT. 27, 1917.

1,337,866.

Patented Apr. 20, 1920.

Inventor:
F. B. Whitaker, Decd
Frank P. Whitaker and
Ethel G. Whitaker.
by Wilkinson & Fisher
ATTORNEYS F. B. WHITAKER, DEC'D.
F. P. WHITAKER, EXECUTOR, AND E. G. GRIFFITHS, (FORMERLY WHITAKER,) EXECUTRIX.
SYSTEM FOR PROTECTING ELECTRIC CABLES.
APPLICATION FILED SEPT. 27, 1917.

1,337,866.

Patented Apr. 20, 1920.

Inventor
F. B. Whitaker Dec'd
Frank P. Whitaker and
Ethel G. Whitaker:
by Wilkinson & Fisher
ATTORNEYS.

F. B. WHITAKER, DEC'D.
F. P. WHITAKER, EXECUTOR, AND E. G. GRIFFITHS, (FORMERLY WHITAKER,) EXECUTRIX.
SYSTEM FOR PROTECTING ELECTRIC CABLES.
APPLICATION FILED SEPT. 27, 1917.

1,337,866.

Patented Apr. 20, 1920.

Inventor:
F. B. Whitaker, Dec'd
Frank P. Whitaker
Ethel G. Whitaker
by Wilkinson & Giusta,
Attorneys.

UNITED STATES PATENT OFFICE.

FREDERICK BERNARD WHITAKER, DECEASED, LATE OF RUGBY, ENGLAND, BY FRANK P. WHITAKER, EXECUTOR, OF RUGBY, ENGLAND, AND ETHEL GRACE GRIFFITHS, FORMERLY WHITAKER, EXECUTRIX, OF RUGBY, ENGLAND.

SYSTEM FOR PROTECTING ELECTRIC CABLES.

1,337,866.      Specification of Letters Patent.      Patented Apr. 20, 1920.

Application filed September 27, 1917. Serial No. 193,531.

*To all whom it may concern:*

Be it known that FREDERICK BERNARD WHITAKER, deceased, late a subject of the King of Great Britain, and a citizen of Rugby, in the county of Warwick, England, has invented certain new and useful Improvements in Systems for Protecting Electric Cables, of which the following is a specification.

The present invention relates to systems for the protection of electrical conductors and cables.

The main purpose of the present invention is to provide means, in the event of a fault developing in any feeder or part of an electrical distribution system, for disconnecting as soon as possible from the system the faulty cable or conductor and only the faulty part.

This invention refers more particularly to systems which are earthed either direct or through a resistance or impedance at one or more points.

Broadly conceived the present invention comprises a conducting shield wholly or partly surrounding the electrical conductor requiring protection and occupying an intermediate position in the supporting insulation between conductor and earth and separated from the conductor and from earth by insulating material, while a circuit which functions to disconnect the faulty conductor from the system is connected between the conductor and the conducting shield surrounding the conductor.

In the case of multi-phase systems and multi-core cables a protective shield is provided for each conductor and between shields insulation is inserted capable of withstanding normally about the full potential difference which is set up between the conductors to which the respective shields belong.

The result of this disposition is that in the event of a leakage being set up from a protective shield to earth owing to a fault, leakage current passes from the conductor through a tripping circuit or circuits to the shield and then by way of the leak to earth, or again in the case of more than one conductor, should a leak be set up between two of the shields the leakage current passes from one conductor through the tripping circuit to the one shield through the leak to the other shield and through the other tripping circuit to the second conductor. The invention makes use of the leakage current as described to trip the switch or switches controlling the faulty part of the system so that this faulty part is isolated from the net work.

The invention provides various methods of arranging the tripping circuits, for example, the shield may be continuous from one end of the conductor, to the other, and the tripping circuit may be placed at one end or in any position or one tripping circuit may be placed at either end. The shield may also be divided up into a number of lengths, each length being associated with a tripping circuit. Further in the case of a multi-core cable or a multi-phase transmission line the tripping circuits associated with some of the conductors may be arranged at one end of the line and the remaining tripping circuits at the other end. This arrangement has the advantage that in the event of one phase or one core developing a fault the tripping circuit operating at one end of the cable can be made to place an artificial fault on the shield which is connected to the tripping circuit at the other end of the cable, with the result that a faulty section is isolated at both ends without the use of pilot wires or similar devices.

In carrying out some of the embodiments of the invention a pilot wire is needed. Examples of the arrangement of such pilot wires are given in the embodiments of the invention illustrated in the annexed drawings in which:—

Figures 1, 2, 3, 4:
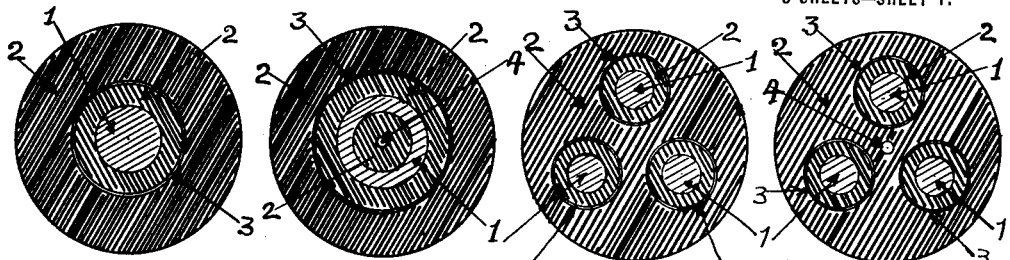
Figure 1 is an end view of a single core cable suitable for use with this system.
Fig. 2 is a similar view of a cable with a pilot wire.
Fig. 3 is an end view of a three-core cable.
Fig. 4 is a similar view of a cable with a pilot wire.

Referring first to Figs. 1 to 4 of the drawings,

In Fig. 1 the cable has a single core 1 with insulation 2 and a conducting shield 3 surrounding the conductor 1.

In Fig. 2 the cable is modified in the sense that the conductor 1 is annular and surrounds the conductor 4 which serves as a pilot wire.

Figs. 3 and 4 are views corresponding to Figs. 1 and 2, showing the construction of a three core cable for use in the present invention.

It should be observed that the insulation between the respective conducting shields 3 is sufficient to withstand the full potential difference between any two of the conductors 1.

Figure 5:
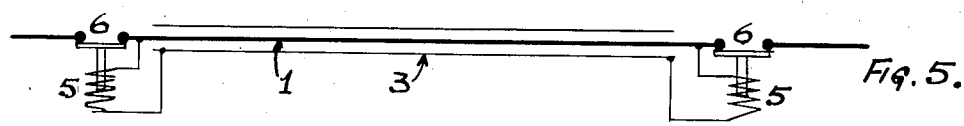
Figs. 5 to 14 are diagrams of various circuit connections embodying the present invention.

In the arrangement illustrated in Fig. 5 there is a tripping circuit at either end of the length of cable. The tripping circuit is represented as a magnet coil 5 and is connected directly between the conductor 1 and the protecting shield 3. The operation of the device is as follows:—

If a leakage is set up between one of the shields 3 and earth, or between shields leakage current passes from the conductor 1 through each tripping coil 5 to the shield 3 and then either through the leak to earth or to the other shield, the coils 5 are energized and open the switches 6 in any known manner.

The tripping circuit 5 may be any circuit of suitable resistance or impedance, and may trip the switches 6 either directly or through transformers, relays and the like.

Figure 6:
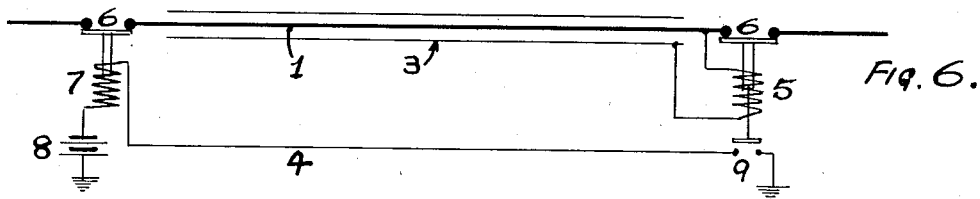

In Fig. 6 the tripping circuit 5 is shown only connected at the right hand end of the length of cable. In operation in the case of a fault in this arrangement the tripping coil 5 is energized and opens its own switch 6, closing the circuit of a tripping coil 7 at the point 9 in the pilot wire 4. The source of E. M. F. 8 shown as a battery, energizes the coil 7 and trips the left hand switch 6.

Figure 7:
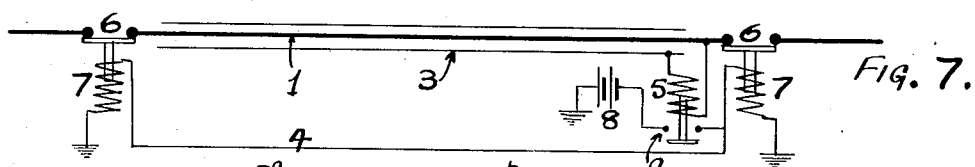

In the arrangement shown in Fig. 7 the energizing of the coil 5 again closes contacts 9 but in this case the effect is to connect the source of E. M. F. 8 to the two releasing coils 7 in parallel. These coils are both energized and the section of cable cut out at both ends.

Figure 8:
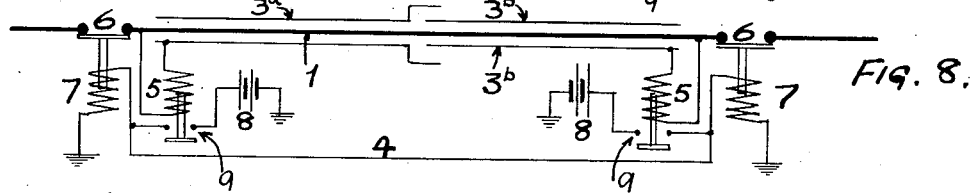

Fig. 8 shows the shield 3 divided into two separate lengths 3ª and 3ᵇ, each length being connected to the conductor 1 through tripping coils 5. As shown each tripping coil acts as a relay to close the circuit of the battery 8 through releasing coil 7 at the point 9, when the device operates as before.

Figure 9:
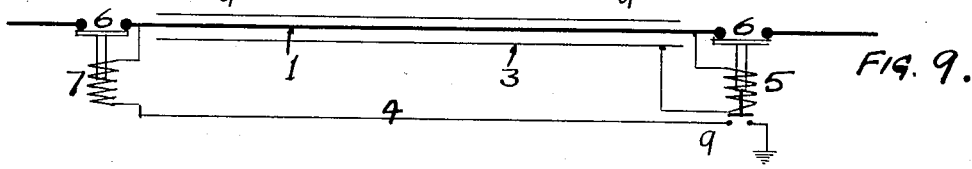

In Fig. 9 a different embodiment again is illustrated. The tripping coil 5 at one end of the cable closes the circuit of the releasing coil 7 at the other end through the pilot wire 4 at the point 9. The opposite end of the coil 7, however, is connected to the conductor 1 whence this coil derives its E. M. F. instead of from the battery 8.

Figure 10:
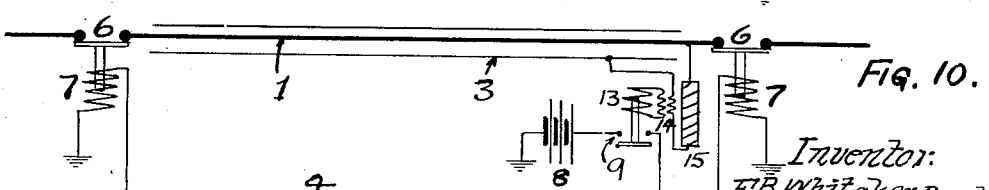

Fig. 10 shows the case already referred to in which the tripping circuit comprises the primary winding of a current transformer 14 in series with an impedance 15. The secondary winding of transformer 14 supplies the coil 13 which completes at 9 the circuit of the battery 8 through the two releasing coils 7 in parallel.

Figure 11:

Fig. 11 illustrates perhaps the simplest case of all, that is to say, a feeder connected to the source of supply through a switch 6 at one end only. 1 represents the conductor, 3 represents the shield protecting the conductor and 5 represents the tripping circuit connected between the conductor and its shield. In the event of a fault taking place between the shield 3 and earth or to other phase, current will flow from the conductor 1 through the tripping circuit 5 to the shield and thence to earth or another phase. The passage of current through the tripping circuit 5 will be utilized to disconnect the cable from the system by opening the switch 6.

Figure 12:
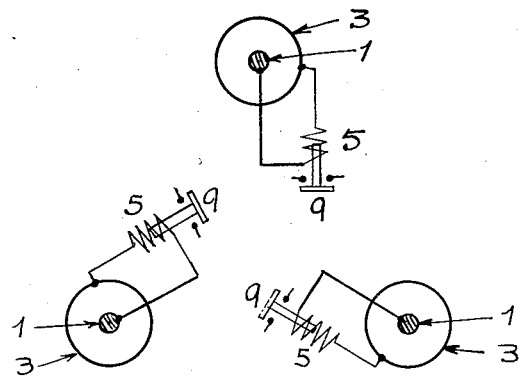

Fig. 12 is a diagrammatic end view of a three-phase feeder, each conductor 1 has a shield 3 as illustrated in Fig. 3, and between each conductor 1 and its shield 3 a tripping coil 5 is connected, adapted to cut off the respective conductor in case of a fault to earth or between phases. It will thus be seen that if a fault occurs between one shield 3 and earth, current will flow from the conductor 1 through the tripping circuit 5 to the shield 3 and thence to earth. The passage of the current through the tripping circuit 5 will be made to open the switches controlling the cable. If a fault occurs between phases then current will flow from one conductor 1 through the tripping circuit 5 to shield 3 thence across the fault to another shield 3 thence through the other tripping circuit 5 to another conductor 1. The passage of the fault current through the two tripping circuits 5 will be made to open the switches controlling the cable.

Figure 13:
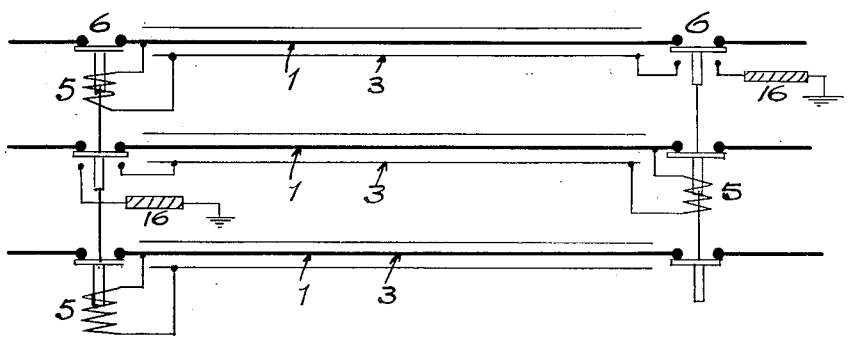

Fig. 13 is a diagram of a similar feeder in which, however, two of the tripping circuits 5 are at the left hand end of the feeder and the remaining one at the right hand end.

In the case of two of the conductors at the opposite end to the tripping circuit 5 there is an impedance 16 through which the shield 3 is connected to earth when the switch 6 opens. In this arrangement if a fault occurs to earth on one of the shields 3 one of the coils 5 is energized, the switch 6 being opened, the shield 3 of another conductor is connected to earth at that end through the impedance 16 by means of which the corresponding coil 5 at the other end is energized and so the faulty cable is disconnected at both ends.

Figure 14:
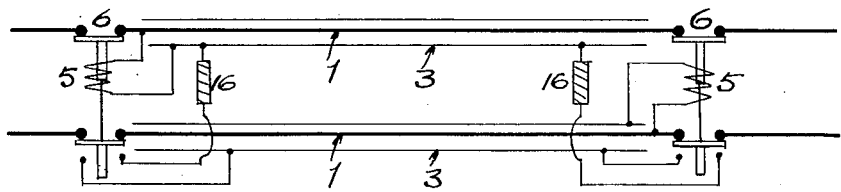

Fig. 14 shows a similar arrangement for a go and return conductor. In this case the artificial fault is created by the back contacts of the switch 6 connecting the impedance 16 between the two shields 3. Thus the shields are connected together instead of connecting either of them to earth. Of course in either of these cases the value of the artificial fault can be limited by the value of the resistance of impedance 16. Also the artificial fault can be made by the relay acting and not necessarily by the movement of the switch.

It is necessary to recognize that the invention is not limited to any particular shape of conductor, cable, or feeder, nor to any particular form of insulation.

Figure 15:
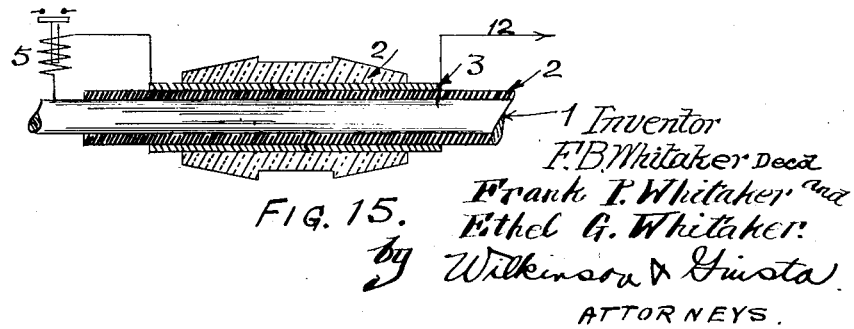
Figs. 15 to 17 are vertical sections of insulators for supporting conductors or cables in accordance with the present invention.
Figure 16:
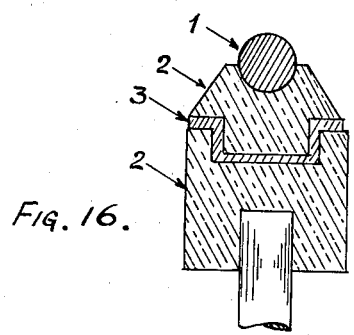

It will be understood that a shield effectively surrounds a conductor when faults will occur between shields and earth or between shields rather than from conductor to earth or between conductors even though the fault occurs along any axis radial to the conductor. Also for example Fig. 15 is a section of an insulator in which 1 represents the conductor 2 represents insulation and 3 represents a conducting shield surrounding the conductor and insulated from the conductor and earth. With this construction the shield may surround the conductor only for that part of its length which is liable to faults. The shields in each insulator in such cases would be connected together by a lead "12" and finally connected through a tripping circuit "5" to the conductor which the shields surround; and again in Fig. 16 the insulation 2 is of yet a further shape.

Figure 17:
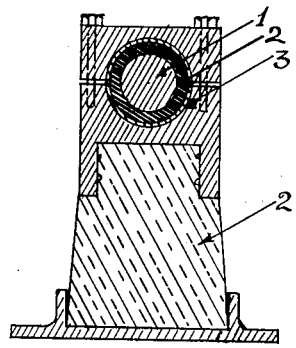

Yet another form of supporting insulation is found in Fig. 17. The conductor 1 to be protected is shown supported in insulations 2 which is surrounded by the shield 3. This shield can be held firmly in the clamp shown at the top of the insulator or the clamp of the insulator can actually form the shield providing it is made of conducting material.

Figure 18:
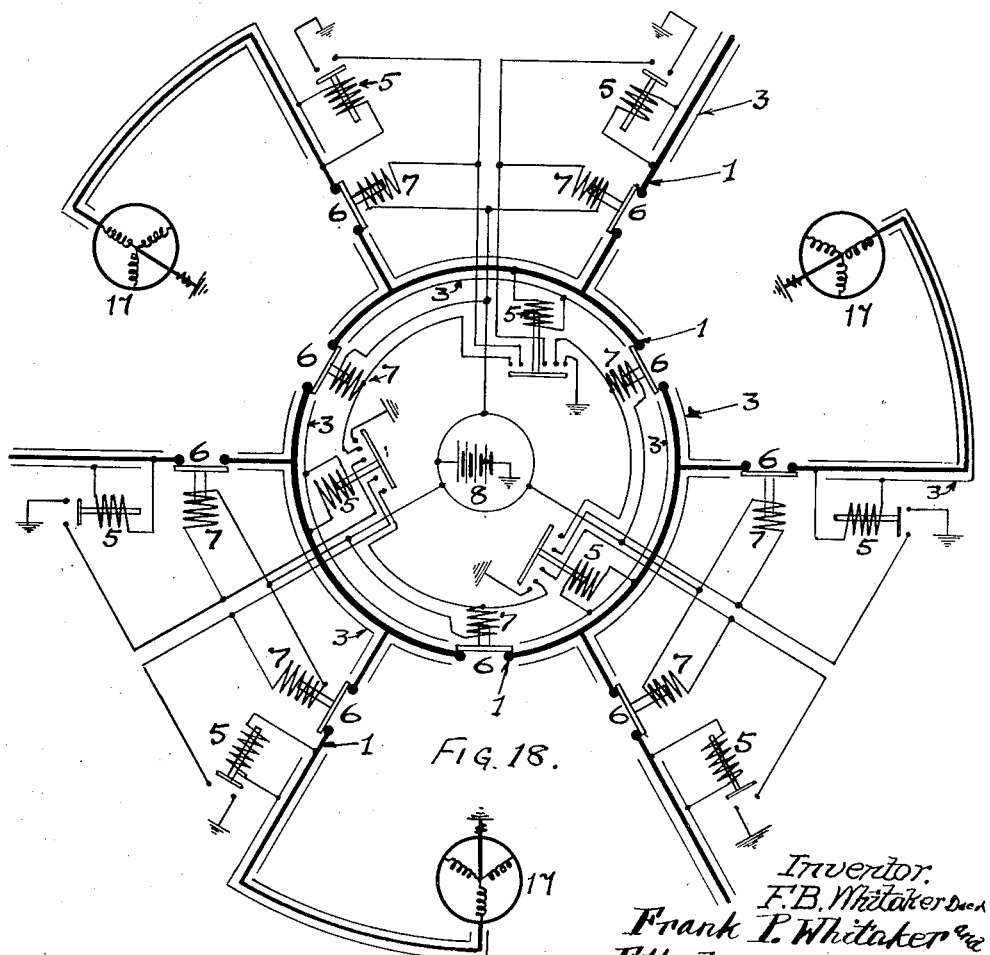
Fig. 18 is a circuit diagram of a net-work of conductors protected by the present invention.

In Fig. 18 a net-work of conductors protected by the invention is illustrated and is so arranged that a fault on any one section would immediately isolate the same. Fig. 18 illustrates a network of conductors protected by the invention, and they are so arranged that a fault on any one section would immediately isolate the same. This figure represents the connections between generators, busbars, and feeders in a generating station, 17 illustrating the generators which are each connected to one section of the busbars and to each section of the busbars a feeder is connected. For simplicity only one phase is shown. It will be seen that each generator 17 is connected to a section of the busbars by a switch 6; also each feeder is connected to a section of the busbar by a switch 6; also each section of busbar is connected to the adjacent sections of busbar by switches 6. Now it will be seen that a tripping circuit 5 is connected between each conductor 1, which forms a busbar section, and its shield 3 and also between each conductor 1, which connects the generators 17 with the busbars, and its shield e and also between each feeder conductor 1 and its shield 3. Should a fault develop on a busbar section between the shield surrounding the busbar conductor and earth or between the shield and a shield surrounding another conductor, then the fault current will pass from the conductor 1 through the tripping circuit 5 to the shield 3 and then to earth or another phase. The passage of the fault current through the tripping circuit 5 will be used to open all the switches 6 surrounding the faulty busbar section by connecting the source of E. M. F. 8 to the operating coils 7 of all the switches surrounding the faulty section. If a fault occurs between the shield 3 of a feeder and earth or another phase, then the fault current will pass from the conductor 1 of the feeder through the tripping circuit 5 of the feeder to the shield 3 and thence to earth or to another phase. The passage of the fault current through the feeder tripping circuit 5 will be used to open the switch 6 connecting the feeder to the busbars, by connecting the source of E. M. F. 8 to the operating coil 7 of the feeder switch 6.

If a fault were to occur between shields or between shield and earth in the conductors connecting the generators to the busbars, then the fault passing through the generator conductor tripping circuit 5 would be used to disconnect the generator cable from the busbars, by opening the switch 6 between the generator and the busbars.

The arrangement shown as Fig. 18 is generally suitable where all conductors are arranged inside one station and in this case the conductors may often be supported on insulators. Should any one of the protecting shields 3 develop a fault current will pass through the corresponding tripping coil 5. This will draw in its plunger and connect the sources of E. M. F. 8 to the releasing coil 7 of all the switches controlling the faulty conductor in question. The generators supplying the net-work are shown at 17. This embodiment is generally suitable where all conductors are arranged inside one station, in which case the conductors would be often supported upon insulators.

It will be understood that there is no direct electrical connection between one shield and another, i. e. the shields do not form the neutral point of the system. On the contrary neglecting the effect of capacity currents the shield will assume the same potential as the conductor it surrounds or protects. The operation of the tripping arrangements does not depend on a balance of two or more coils connected between the conductors and their respective shields, on the contrary if in a three phase cable a fault to earth could occur on all three phases at the same instant, all three tripping circuits would operate and the cable would be disconnected.

What is claimed is:

1. A system for the protection of electric conductors, cables and feeders, consisting in the combination with the conductor to be protected of a conducting shield located in an intermediate position in the insulation between the conductor and earth, insulation separating said shield from said conductor and from earth, a circuit connecting said conductor with said shield, switch apparatus for isolating said conductor, and means operable by the current in said circuit for causing the actuation of said switch apparatus.

2. A system for the protection of electric conductors, cables and feeders, consisting in the combination with the conductor to be protected of a conducting shield located in an intermediate position in the insulation between the conductor and earth, insulation separating said shield from said conductor and from earth, a circuit connecting said conductor with said shield at one end of the conductor, switch apparatus for disconnecting that end of said conductor, means operable by current in said circuit for causing the actuation of said switch apparatus, and a circuit connecting said conductor with said shield at the other end of the conductor, switch apparatus for disconnecting the other end of said conductor, and means operable by current in said circuit for causing the actuation of said switch apparatus.

3. A system for the protection of a multicore electric cable consisting in the combination with said cable of a conducting shield surrounding each core and located in an intermediate position in the insulation between the core and earth, the shields being not directly connected to each other, insulation separating said shield from the core, from other shields, and from earth, a circuit connected between each core and its respective shield and means for controlling the isolation of said cable inserted in said circuits.

4. A system for the protection of a multicore electric cable consisting in the combination with said cable of a conducting shield surrounding each core and located in an intermediate position in the insulation between the core and earth, insulation separating said shield from the core, from other shields, and from earth, the shields being not directly connected to each other, a circuit connecting each core with its respective shield at one end of the cable and means for controlling the disconnection of that end of said cable from the system inserted in said circuits, and a circuit connecting each core with its respective shield at the other end of the cable and means for controlling the disconnection of that end of said cable from the system inserted in those circuits.

5. A system for the protection of a multicore electric cable consisting in the combination with said cable of a conducting shield surrounding each core and located in an intermediate position in the insulation between the core and earth, the shields being not directly connected to each other, insulation separating said shield from the core, from other shields, and from earth, circuits connected between some of the cores and their respective shields at one end of the cable, circuits connected between the remaining cores and their respective shields at the other end of the cable and means for controlling the isolation of said cable inserted in said circuits.

6. A system for the protection of multiphase transmission cables consisting in the combination with said cables of a conducting shield surrounding each conductor and located in an intermediate position in the insulation between conductor and earth, the shields not being directly connected together, insulation separating each shield from the respective conductor and from earth, circuits connected between some of the conductors and their respective shields at one end of the transmission cables, circuits connected between the remaining conductors and their respective shields at the other end of the transmission cables, and means for controlling the isolation of said cables inserted in said circuits.

7. A system for the protection of out and return conductors consisting in the combination with said conductors of a conducting shield surrounding each conductor and located in an intermediate position in the insulation between the conductor and earth, the shields being insulated from and not directly connected to each other, insulation separating said shield from its respective conductor and from earth, a circuit connected between the out conductor and its shield at one end of the transmission, a circuit connected between the return conductor and its shield at the other end of the transmission and means for controlling the isolation of said conductors inserted in said circuits.

8. A system for the protection of electric conductors, consisting in the combination with the conductor to be protected of a conducting shield for each conductor located in an intermediate position in the insulation between the conductor and a shield belonging to another conductor, the shields not being directly connected with each other, insulation separating the shield from its conductor and from the shield belonging to another conductor, a circuit connecting each of said conductors with their respective shields and means for controlling the isolation of said conductors inserted in said circuits.

In testimony whereof we sign our names to this specification in the presence of subscribing witnesses.

F. P. WHITAKER,
*Executor of Frederick Bernard Whitaker, deceased.*

Witnesses:
  C. G. COYSH,
  R. F. COYSH.

ETHEL G. WHITAKER,
*Executrix of Frederick Bernard Whitaker, deceased.*

Witnesses:
  J. IVOR GRIFFITHS,
  H. W. K. JENNINGS.